US010164932B2

(12) United States Patent
Attolini et al.

(10) Patent No.: US 10,164,932 B2
(45) Date of Patent: Dec. 25, 2018

(54) COMMUNICATION SYSTEM AND SERVER FACILITATING MESSAGE EXCHANGE AND RELATED METHODS

(71) Applicant: LOTURAS LLC, Miami, FL (US)

(72) Inventors: Peter Paulo Azcue Attolini, Miami, FL (US); Rodrigo Enrique Galavis Rovati, Miami, FL (US)

(73) Assignee: LOTURAS INCORPORATED, Miami, FL (US)

(*) Notice: Subject to any disclaimer, the term of this patent is extended or adjusted under 35 U.S.C. 154(b) by 169 days.

(21) Appl. No.: 15/008,969

(22) Filed: Jan. 28, 2016

(65) Prior Publication Data

US 2016/0226812 A1 Aug. 4, 2016

Related U.S. Application Data

(60) Provisional application No. 62/109,758, filed on Jan. 30, 2015.

(51) Int. Cl.
*G06F 15/16* (2006.01)
*H04L 12/58* (2006.01)
(Continued)

(52) U.S. Cl.
CPC ............ *H04L 51/32* (2013.01); *G06Q 30/08* (2013.01); *G06Q 50/01* (2013.01); *G06Q 20/10* (2013.01); *G06Q 20/16* (2013.01); *H04L 29/06653* (2013.01); *H04L 29/12433* (2013.01); *H04L 51/00* (2013.01); *H04L 51/18* (2013.01); *H04L 61/2539* (2013.01); *H04L 63/0421* (2013.01);
(Continued)

(58) Field of Classification Search
CPC ........ G06Q 20/10; G06Q 20/16; G06Q 30/08; G06Q 20/385; G06Q 40/04; G06Q 50/01; H04L 2209/56; H04L 51/00; H04L 51/18; H04L 51/32; H04L 67/306; H04L 29/06653; H04L 29/12433; H04L 61/2539; H04L 63/0421; H04M 3/42008
USPC ..... 709/206; 705/37, 39, 26.3, 26.35, 14.71, 705/80
See application file for complete search history.

(56) References Cited

U.S. PATENT DOCUMENTS 7,181,764 B2 2/2007 Zhu et al.
7,305,445 B2 12/2007 Singh et al.
(Continued)

*Primary Examiner* — Liang Che A Wang
*Assistant Examiner* — Johnny B Aguiar
(74) *Attorney, Agent, or Firm* — Allen, Dyer, Doppelt & Gilchrist, P.A.

(57) ABSTRACT

A communication system may include a server, and first and second communications devices. The server may be configured to maintain a database having first and second communication profiles respectively associated with first and second users, and maintain first and second value accounts respectively associated with the first and second communication profiles. The server may be configured to process the message from the first user, debit the transaction value from the first value account, convert the message to be from the masked email address of the first user and send the converted message to the actual email address of the second user, and when receiving an acceptance message from the second user in reply to the converted message, then facilitate a communication between the first and second users, and transfer the debited transaction value to the second value account of the second user.

20 Claims, 14 Drawing Sheets

(51) Int. Cl.
  *G06Q 30/08* (2012.01)
  *G06Q 50/00* (2012.01)
  *H04L 29/12* (2006.01)
  *H04L 29/06* (2006.01)
  *G06Q 20/10* (2012.01)
  *G06Q 20/16* (2012.01)
  *H04L 29/08* (2006.01)
  *H04M 3/42* (2006.01)

(52) U.S. Cl.
  CPC ....... *H04L 67/306* (2013.01); *H04M 3/42008* (2013.01)

(56) References Cited

U.S. PATENT DOCUMENTS

| | | |
|---|---|---|
| 7,581,221 B2 | 8/2009 | Lai et al. |
| 7,873,573 B2 | 1/2011 | Realini |
| 8,249,965 B2 | 8/2012 | Tumminaro |
| 8,281,372 B1 | 10/2012 | Vidal |
| 2001/0037315 A1* | 11/2001 | Saliba ............... G06Q 10/107 705/70 |
| 2002/0138573 A1 | 9/2002 | Saguy |
| 2004/0148252 A1* | 7/2004 | Fleishman .......... G06Q 20/40 705/39 |
| 2006/0031153 A1 | 2/2006 | Kim |
| 2006/0133340 A1 | 6/2006 | Rybak et al. |
| 2006/0235803 A1 | 10/2006 | Romney |
| 2007/0220090 A1 | 9/2007 | Hall |
| 2007/0255652 A1 | 11/2007 | Tumminaro et al. |
| 2007/0255662 A1 | 11/2007 | Tumminaro |
| 2008/0052364 A1* | 2/2008 | Zhou .................. G06Q 10/107 709/206 |
| 2008/0195705 A1 | 8/2008 | Lee |
| 2010/0114775 A1 | 5/2010 | Griffin |
| 2010/0306122 A1 | 12/2010 | Shaffer |
| 2011/0010340 A1 | 1/2011 | Hung et al. |
| 2011/0022522 A1 | 1/2011 | Sege |
| 2011/0113084 A1 | 5/2011 | Ramnani |
| 2011/0154445 A1 | 6/2011 | Schmidt-Karaca et al. |
| 2011/0177829 A1 | 7/2011 | Platt et al. |
| 2011/0238553 A1* | 9/2011 | Raj ....................... G06Q 20/10 705/37 |
| 2011/0270926 A1 | 11/2011 | Boyd et al. |
| 2012/0150973 A1 | 6/2012 | Barak |
| 2012/0231770 A1 | 9/2012 | Clarke et al. |
| 2012/0284115 A1* | 11/2012 | Reardon ............. G06Q 20/10 705/14.49 |
| 2013/0275301 A1* | 10/2013 | Lehman ............. G06Q 20/04 705/42 |
| 2014/0279436 A1* | 9/2014 | Dorsey ................. G06Q 40/02 705/39 |
| 2014/0310365 A1 | 10/2014 | Sample et al. |

* cited by examiner

COMMUNICATION SYSTEM AND SERVER FACILITATING MESSAGE EXCHANGE AND RELATED METHODS

RELATED APPLICATION

This application is based upon prior filed copending Application No. 62/109,758 filed Jan. 30, 2015, the entire subject matter of which is incorporated herein by reference in its entirety.

TECHNICAL FIELD

The present disclosure relates to the field of communications, and, more particularly, to a communication system for facilitating communications within a network and related methods.

BACKGROUND

Social networks have become pervasive and diverse in modern society. Indeed, with the leading social networking service serving over one billion users worldwide, development of social networks has progressed quickly, for example, Facebook, Twitter, and Instagram. Indeed, with the maturing of the social network market, more use specific social networks have been deployed, such as Twitter (short text based) and Instagram (picture based).

One specific type of social network is the business-oriented social network, for example, LinkedIn, Viadeo, and Xing. One relatively unique feature with the business-oriented social networks is access to communication to other non-connected members (i.e. non-friends). Indeed, with LinkedIn, unfettered communication to other non-connected members is provided on a subscription fee basis. A potential drawback to this approach is that non-connected members receiving unsolicited messages may still ignore the message, reducing the incentive to become a subscribing member of the business-oriented social network.

SUMMARY

Generally speaking, a communication system may include a server comprising a processor and memory associated therewith, and first and second communications devices respectively associated with first and second users. Each of the first and second communications devices comprises a processor and memory associated therewith. The server may be configured to maintain a database comprising first and second communication profiles respectively associated with the first and second users, and maintain first and second value accounts respectively associated with the first and second communication profiles. Each of the first and second communication profiles may comprise an actual email address, a masked email address, and at least one communication preference value. The first communications device may be configured to send a message from the actual email address of the first user to the masked email address of the second user of the second communications device via the server, the message including a transaction value. The server may be configured to process the message from the first user, and debit the transaction value from the first value account. The server may be configured to convert the message to be from the masked email address of the first user and send the converted message to the actual email address of the second user, and when receiving an acceptance message from the second user in reply to the converted message, then facilitate a communication between the first and second users, and transfer the debited transaction value to the second value account of the second user. Advantageously, the communication system enables a communication between the first and second users that is mutually beneficial.

More specifically, the server may be configured to transfer the debited transaction value to an escrow account before transfer to the second value account. The server may be configured to, when receiving a rejection message from the second user in reply to the converted message, then transfer the debited transaction value from the escrow account to the first value account of the first user, and send a notification message to the first user.

Additionally, the at least one communication preference value may comprise a plurality thereof, for example, a threshold transaction value. The server may be configured to, when the transaction value of the message is less than the threshold transaction value of the second user, generate and send a rejection message to the first user.

In some embodiments, the server may be configured to generate the converted message having embedded acceptance and rejection buttons therein. The server may be configured to generate the converted message having at least one uniform resource locator (URL) link embedded within the converted message. The second communications device may be configured to send the acceptance message by accessing the at least one URL link embedded within the converted message. The server may be configured to facilitate the communication between the first and second users by generating a blind voice over internet protocol (VoIP) connection between the first and second communications devices.

Another aspect is directed to a server operating in a communication system having first and second communications devices respectively associated with first and second users. The server may include a processor and memory associated therewith configured to maintain a database comprising first and second communication profiles respectively associated with the first and second users, and maintain first and second value accounts respectively associated with the first and second communication profiles. Each of the first and second communication profiles may comprise an actual email address, a masked email address, and at least one communication preference value. The processor and memory may be configured to receive a message from the first communications device from the actual email address of the first user directed to the masked email address of the second user of the second communications device, the message including a transaction value, and process the message from the first user. The processor and memory may be configured to debit the transaction value from the first value account, convert the message to be from the masked email address of the first user and send the converted message to the actual email address of the second user, and when receiving an acceptance message from the second user in reply to the converted message, then facilitate a communication between the first and second users, and transfer the debited transaction value to the second value account of the second user.

Another aspect is directed to a method for operating a server in a communication system having first and second communications devices respectively associated with first and second users. The method may include operating a processor and memory in the server to maintain a database comprising first and second communication profiles respectively associated with the first and second users, and maintain first and second value accounts respectively associated with the first and second communication profiles. Each of the first and second communication profiles may include an actual email address, a masked email address, and at least one communication preference value. The method may include operating the processor and memory in the server to receive a message from the first communications device from the actual email address of the first user directed to the masked email address of the second user of the second communications device, the message including a transaction value, process the message from the first user, and debit the transaction value from the first value account. The method may include operating the processor and memory in the server to convert the message to be from the masked email address of the first user and send the converted message to the actual email address of the second user, and when receiving an acceptance message from the second user in reply to the converted message, then facilitate a communication between the first and second users, and transfer the debited transaction value to the second value account of the second user.

DETAILED DESCRIPTION

Figure 1:
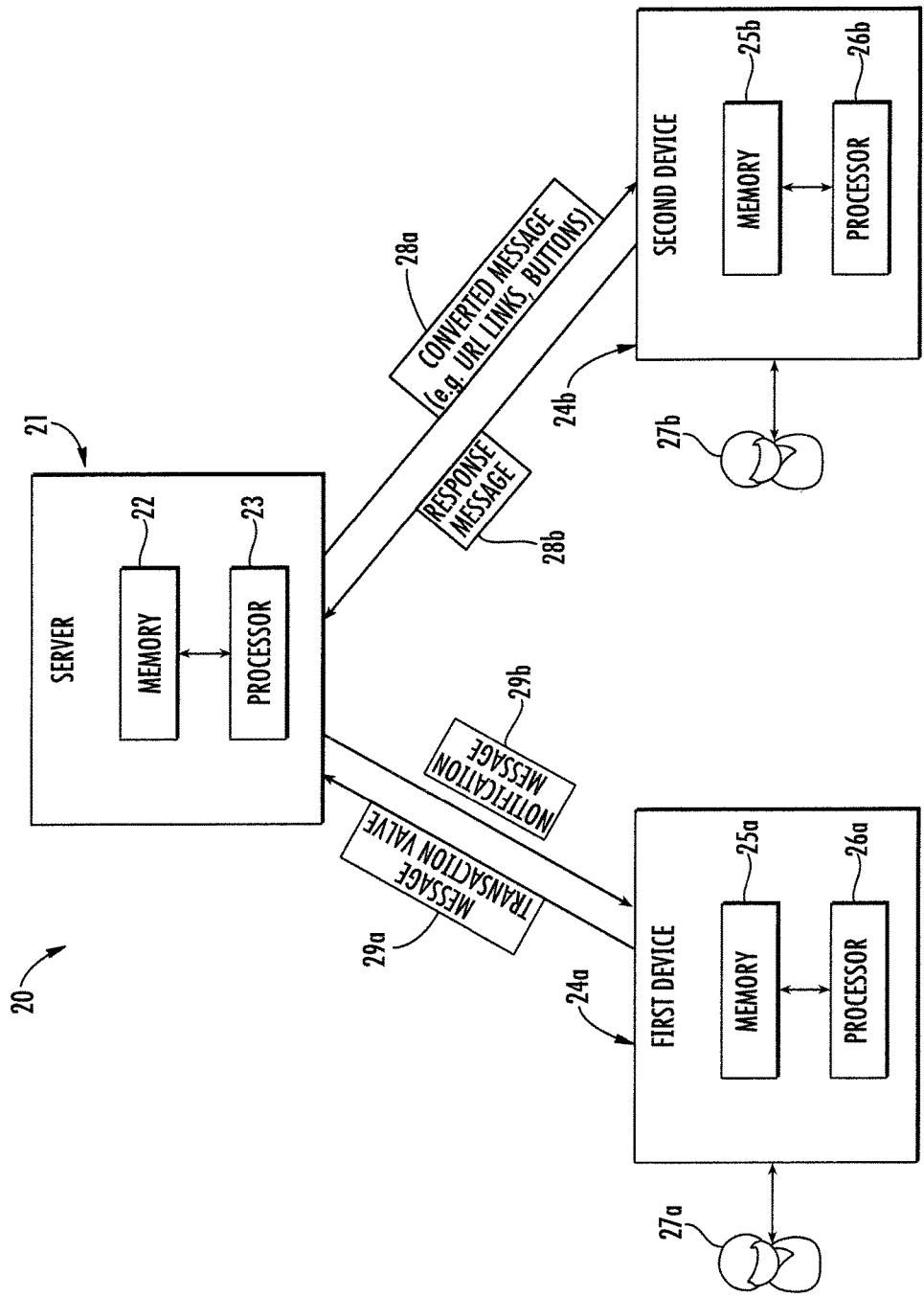
FIG. 1 is a schematic diagram of a communication system, according to the present disclosure.
Figure 2:
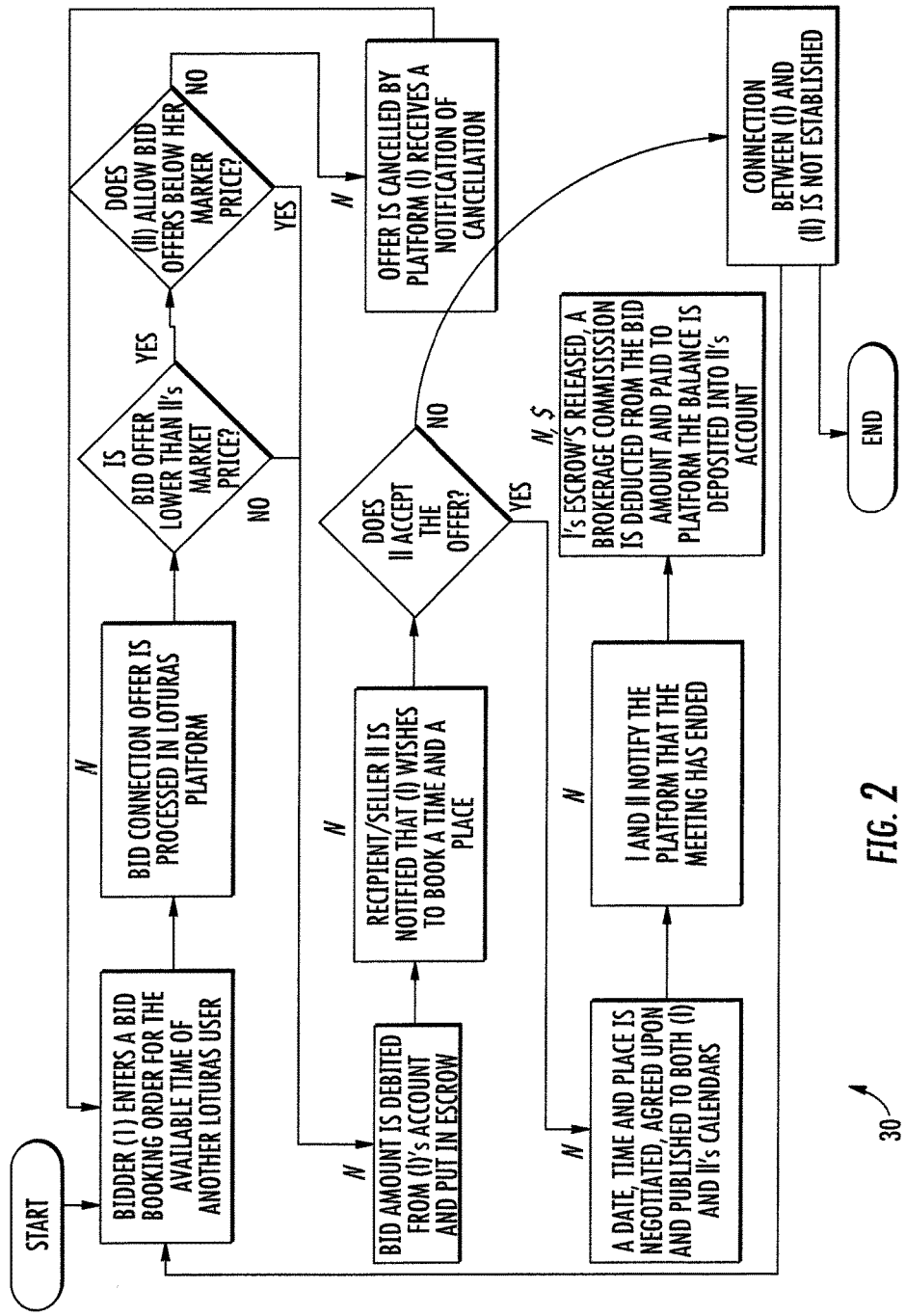
FIGS. 2-10 are flowcharts illustrating operation of the communication system from FIG. 1.
Figure 3:
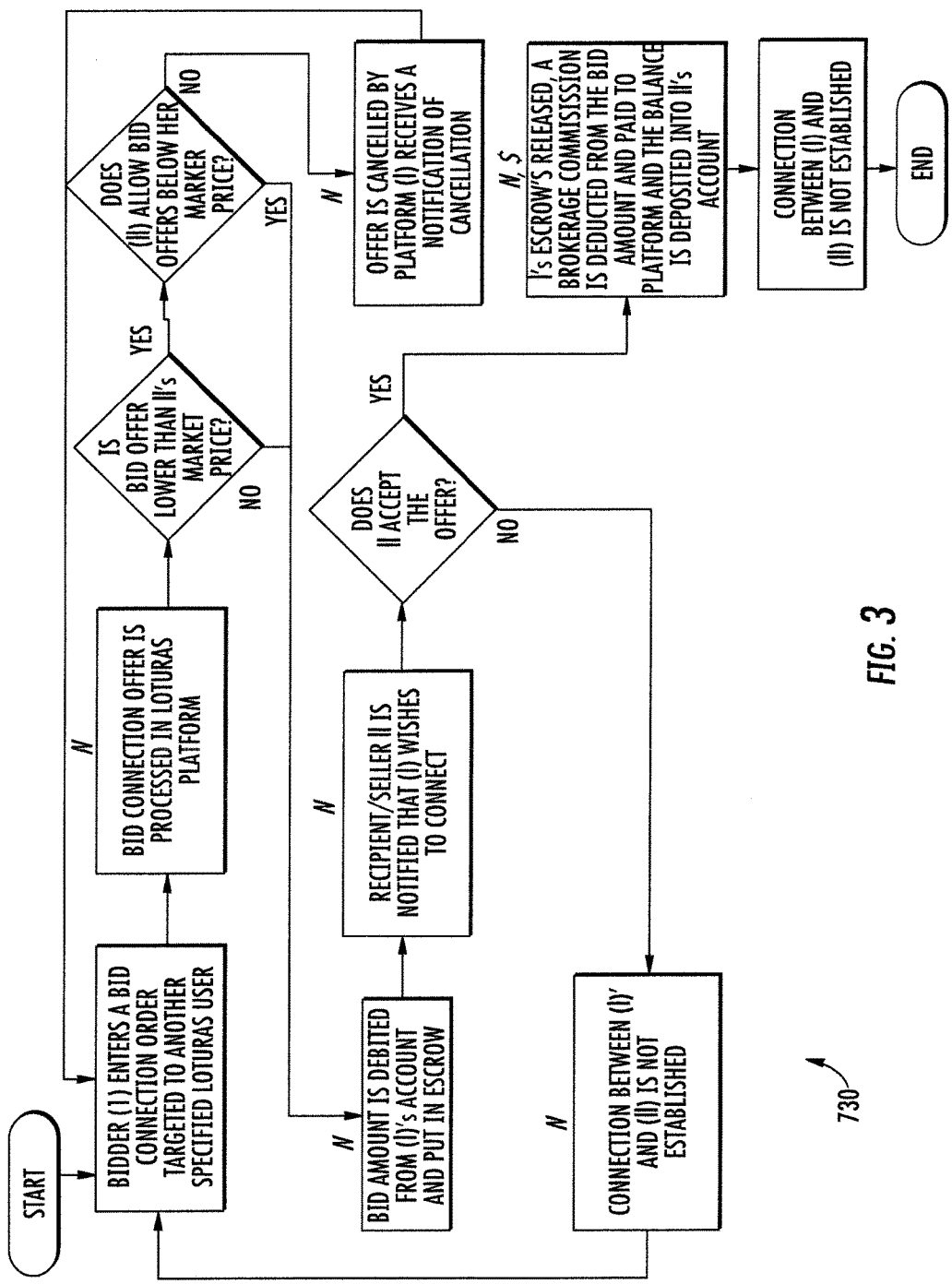
Figure 4:
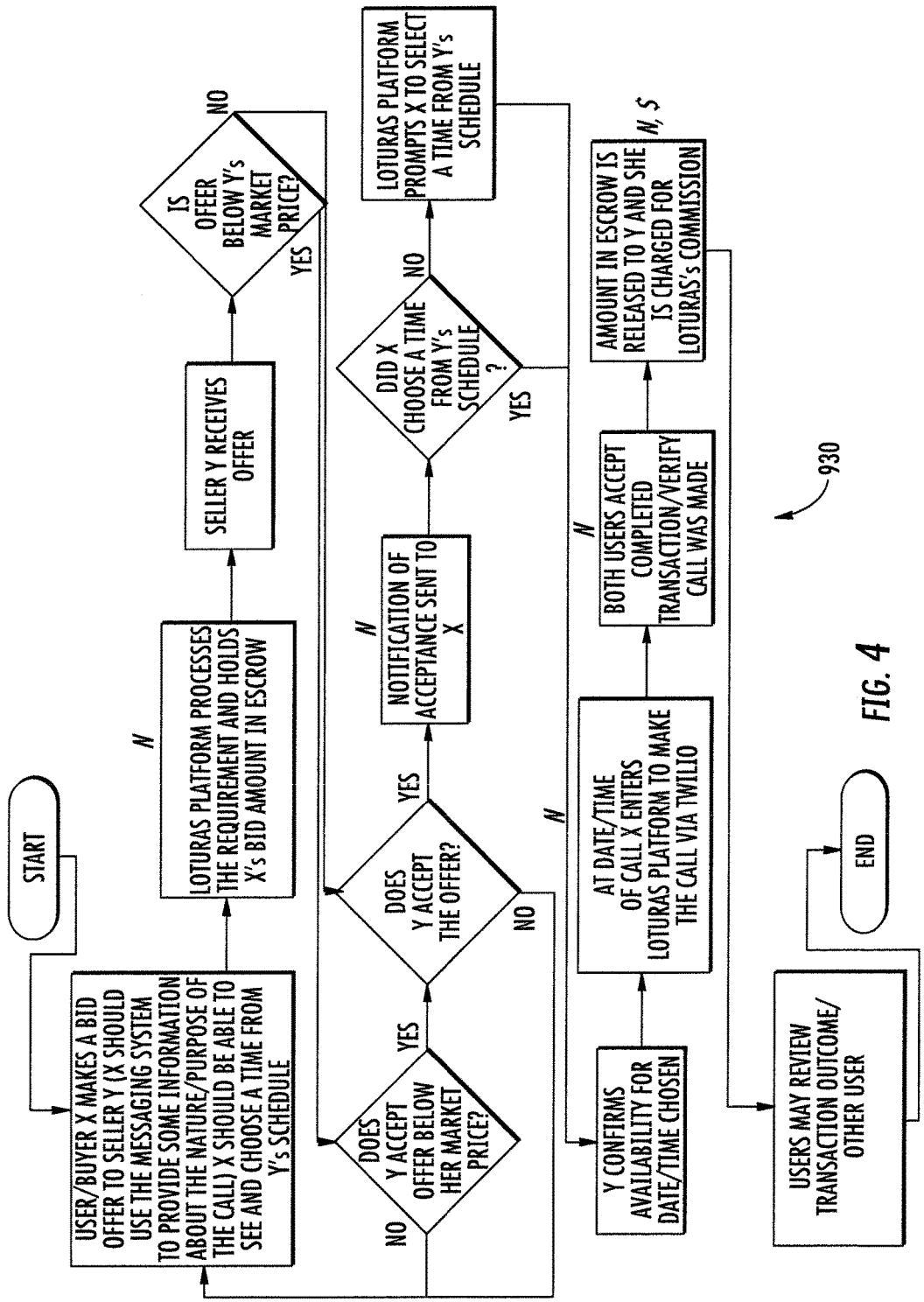
Figure 5:
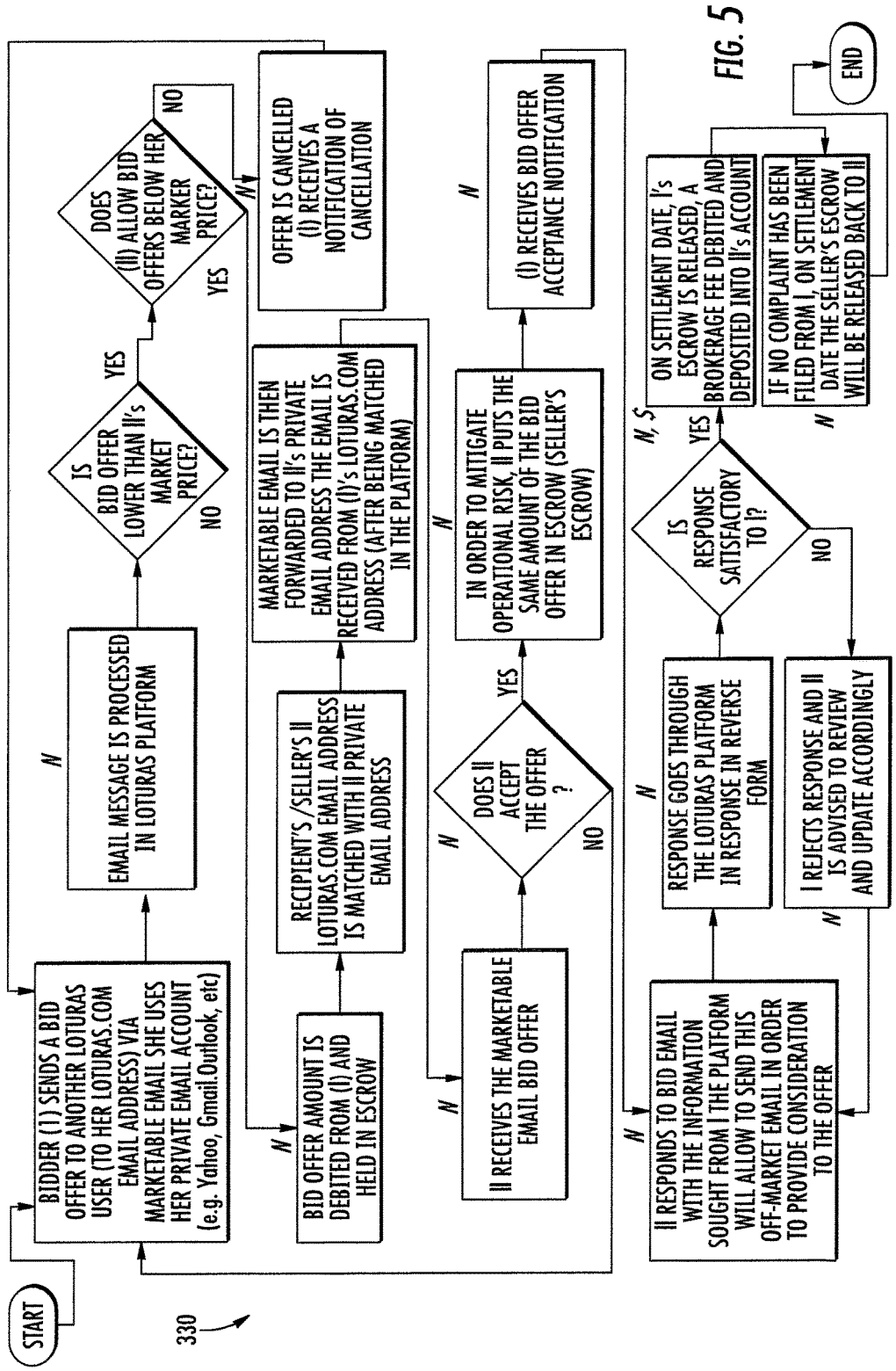
Figure 6:
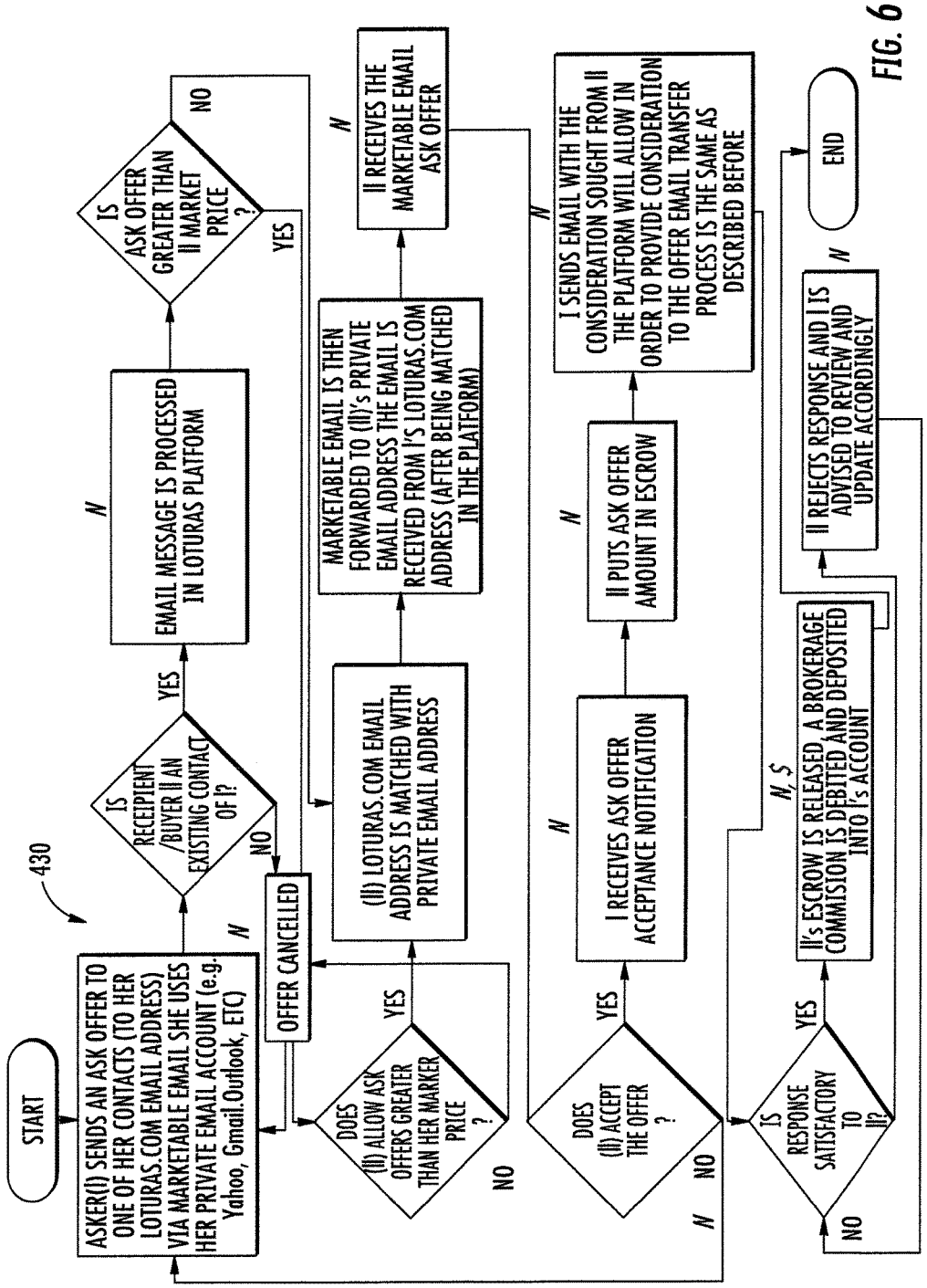
Figure 7:
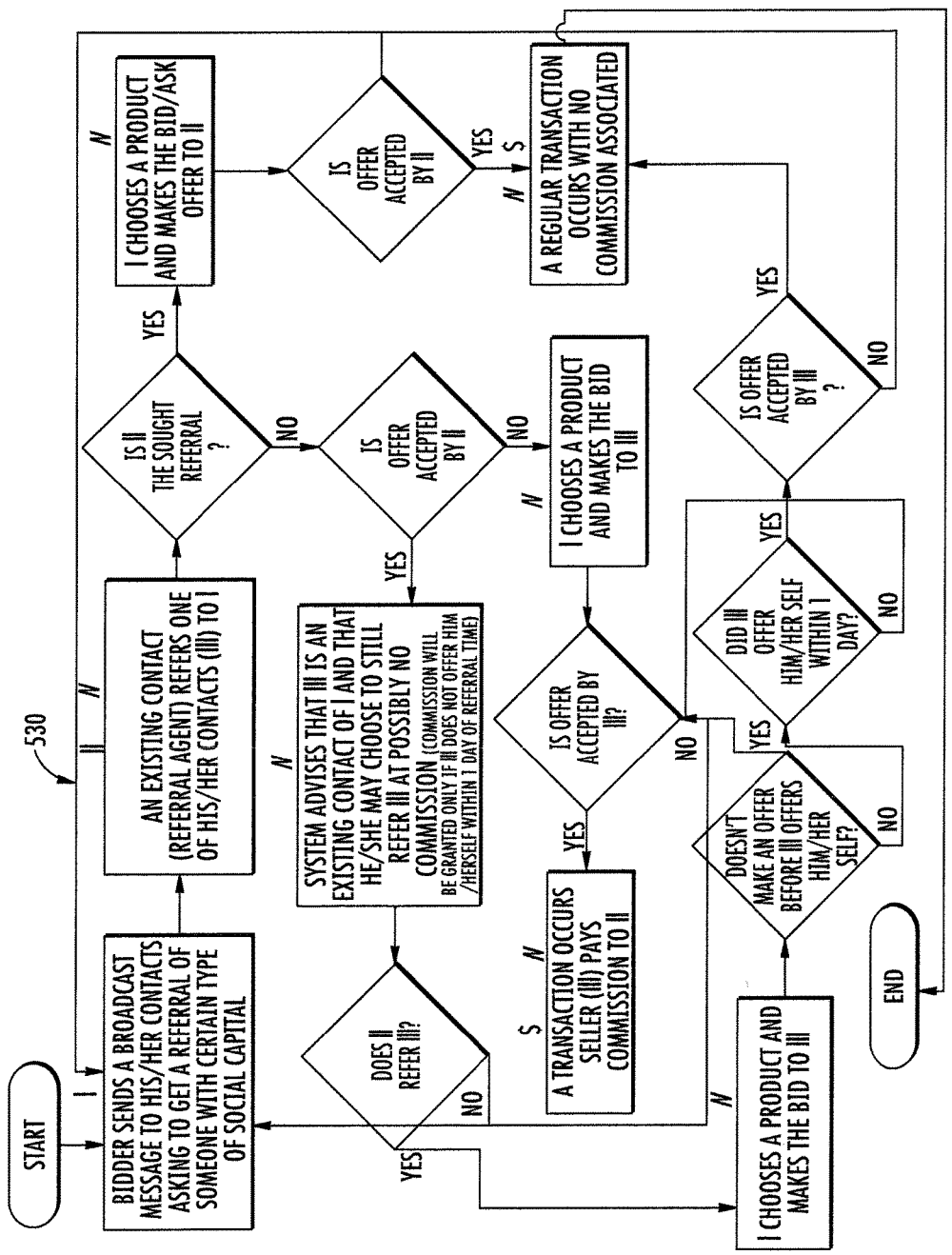
Figure 8:
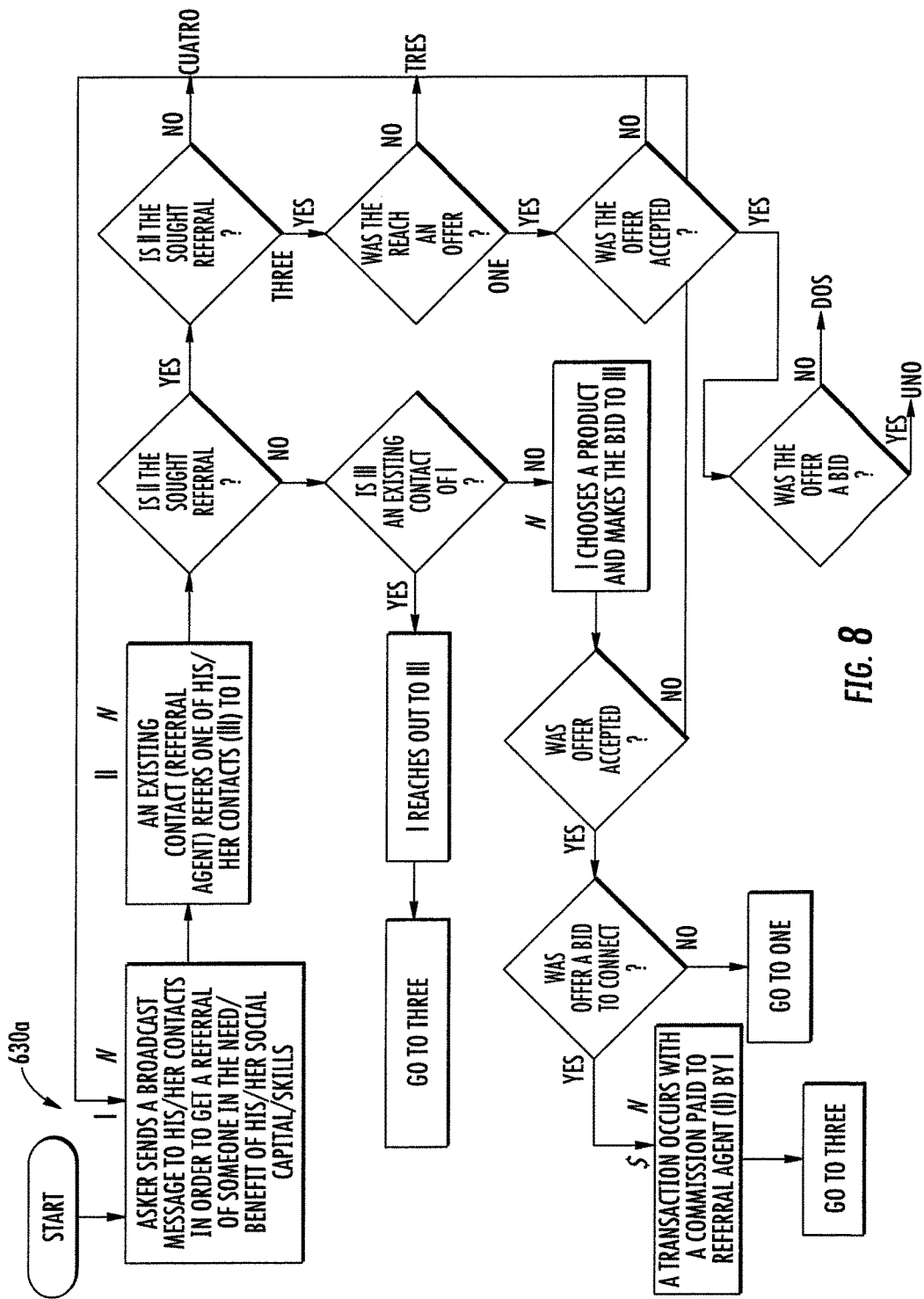
Figure 9:
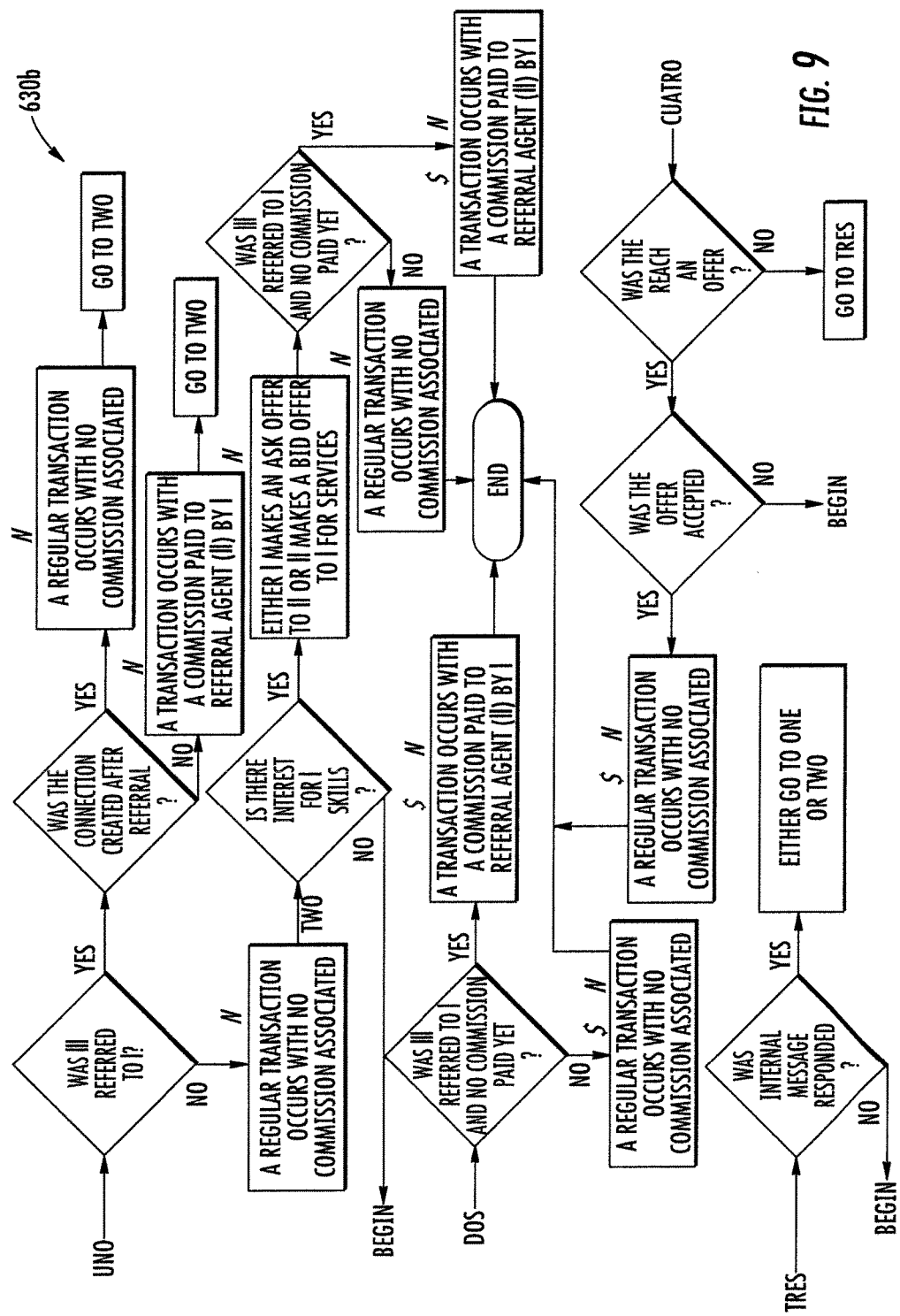
Figure 10:
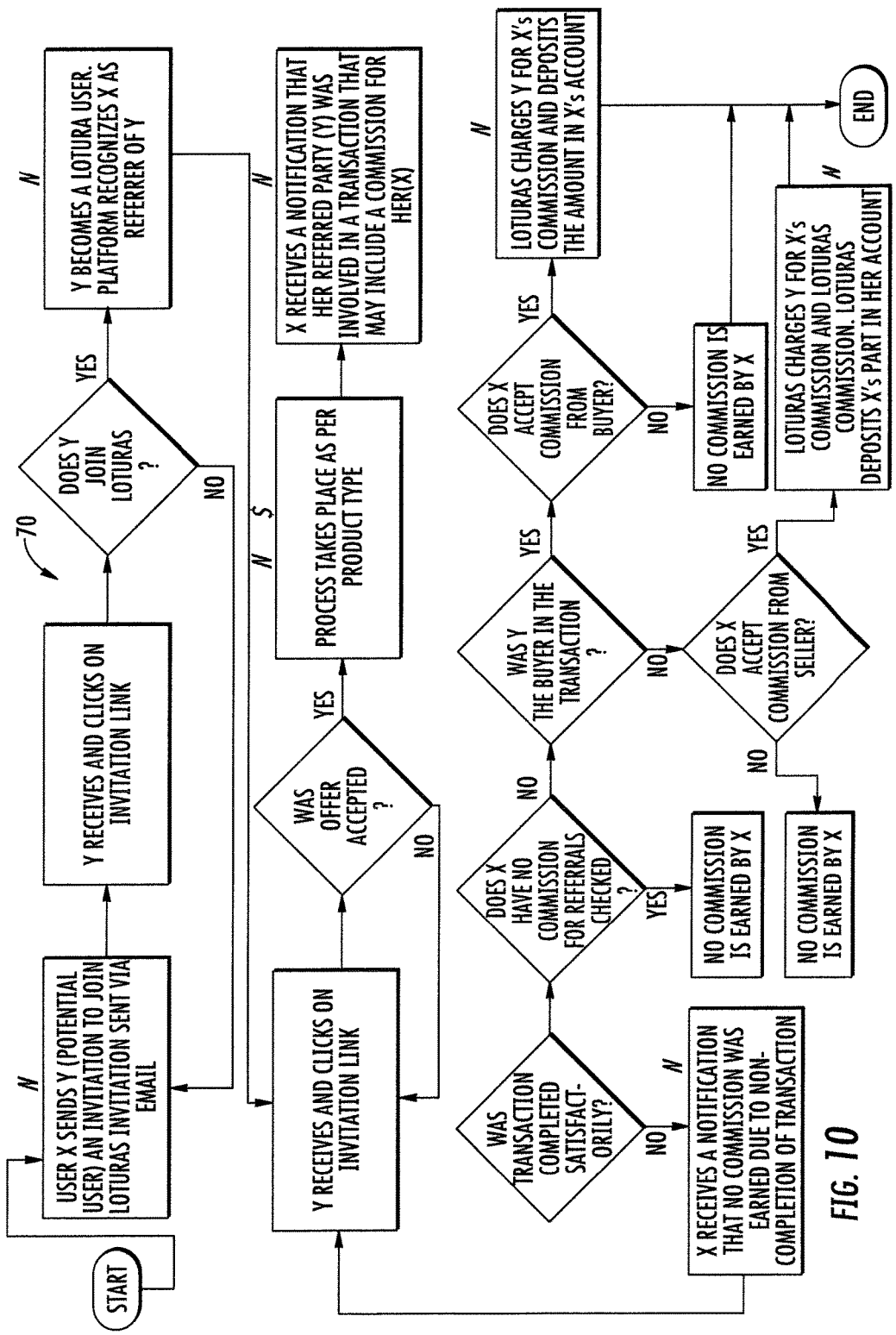

The present disclosure will now be described more fully hereinafter with reference to the accompanying drawings, in which several embodiments of the present disclosure are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Referring initially to FIG. 1, a communication system 20 according to the present disclosure is now described. The communication system 20 is for operating a social network as described herein. The social network may comprise a large number of users/devices (e.g. several million), but for illustrative clarity, only two users/devices are depicted.

The communication system 20 illustratively includes first and second devices 24a-24b (e.g. computing devices, mobile wireless communications devices, tablet computing devices, desktop computing devices) operated respectively by first and second users 27a-27b, and a server 21 (e.g. web server, SQL server, clouding computing virtual server, such as Amazon Web SERVICES (AWS)) in communication (e.g. wired or wireless network, Internet, local area network) with the first and second devices. The server 21 and first and second devices 24a-24b each comprises a processor 23, 26a-26b, and a memory 22, 25a-25b coupled thereto. The server 21 executes software stored in the memory 22 thereof for operating the social network, and maintains at least one associated database for supporting the social network.

In essence, the social network disclosed herein monetizes communication exchanges between users 27a-27b. In contrast to typical business-oriented social networks that permit the exchange of messages 28a-29b freely or based upon a subscription fee model, this social network operates as a broker for pay-to-communicate exchanges.

For example, in the illustrated embodiment, the first and second users 27a-27b are members of the social network, but they are non-connected (i.e. not friends within the social network). If the first user 27a wants to communicate with the second user 27b (i.e. a communication exchange), the first user sends an offer to the server 21, which then forwards the same to the second user. If the second user 27b accepts the offer, the acceptance is forwarded to the server 21 and then to the first user 27a, and the server completes the brokering of the communication exchange.

The brokering of the communication exchange by the server 21 can include an escrowed currency exchange. In particular, when the first and second users 27a-27b agree to a communication exchange, the server 21 may debit an account associated with the first user 27a, and place the debited amount in escrow until completion of the communication exchange, at which time, the debited amount would be deposited into an account associated with the second user 27b.

In some embodiments, the second user 27b may elect that all communications, even from connected users, include an offer price, i.e. no free communications. Also, the server 21 may maintain a "do not charge" list for the second user 27b, i.e. users that may freely communicate with the second user.

In some embodiments, the brokered communication exchange can comprise an email exchange (masked or nonmasked), or an internal message exchange. Here, the first user 27a would send the message 29a to the server 21, which then routes the message to the second user 27b. The reply message 28b from the second user 27b to the first user 27a would also be similarly routed through the server 21. In some embodiments, the message exchange is blind (masked) in that neither the first nor the second user 27a-27b is aware of the actual email contact address of the other user. Advantageously, this limits communication between the first and second users 27a-27b to the brokered communication exchange. In these embodiments, the email message (bid message) may have the offer embedded therein, i.e. the email would represent an option offer (the offer being: reply to my message for offer amount) to the second user 27b.

In other embodiments, the brokered communication exchange can be an in-person or telephonic/virtual meeting. In these embodiments, the server 21 would coordinate the arrangement of the meeting between the first and second users 27a-27b or even provide a VoIP conduit for the communication exchange. Once the meeting has be completed, the first and second users 27a-27b would need to log-in to the social network and update the server 21 that the meeting was completed, thereby releasing the funds in escrow. Being the broker in the communication exchange, the server 21 would debit a commission fee from the funds in escrow before depositing them in the account of the second user 27b. The feature of the server 21 escrowing the funds from the first user 27a advantageously eliminates the risk of the second user 27b not getting paid, i.e. default.

The aforementioned at least one database supports the functionality of the social network and comprises a plurality of user profiles associated with respective users 27a-27b. In particular, the user profile associated with the first user 27a may include contact data, contact preferences, and financial account information (for payment and debiting of brokered amounts, e.g. PayPal, external bank account). The contact data may include mailing address information, email address information, etc. The contact preferences may include minimum/maximum offer prices for incoming offers, whether the user 27a-27b wishes to even review offers below the minimum offer prices, the "do not charge" list, and allowable communication exchange types.

Also, this social network leverages the interconnected friend network of the first user 27a to expand the potential list of potential recipients. For example, if the first user 27a is looking to setup a communication exchange with a person outside his network of friends/connections, the first user may broadcast a generic offer to his list of friends/connections, permitting the friends/connections to forward the generic offer to their respective friends/connections. Thereby, the first user 27a is able to broadcast his generic offer to a large group of users, increasing the likelihood of its acceptance.

Generally speaking, a communication system 10 may include a server 21 comprising a processor 23 and memory 22 associated therewith, and first and second communications devices 24a-24b respectively associated with first and second users 27a-27b. Each of the first and second communications devices 24a-24b comprises a processor 26a-26b and memory 25a-25b associated therewith. The server 21 may be configured to maintain a database comprising first and second communication profiles respectively associated with the first and second users 27a-27b, and maintain first and second value accounts (e.g. an internal monetary account or external monetary accounts, such as PayPal, or a banking account) respectively associated with the first and second communication profiles. Each of the first and second communication profiles may comprise an actual email address, a masked email address (i.e. an internal handle for use in the communication system 20), and at least one communication preference value. The first communications device 24a may be configured to send a message 29a from the actual email address of the first user 27a to the masked email address of the second user 27b of the second communications device 24b via the server 21, the message including a transaction value (i.e. an offer price or asking price). The server 21 may be configured to process the message 29a from the first user 27a, and debit the transaction value from the first value account. The server 21 may be configured to convert the message 29a to be from the masked email address of the first user 27a and send the converted message 28a to the actual email address of the second user 27b, and when receiving an acceptance message 28b from the second user in reply to the converted message, then facilitate a communication between the first and second users, and transfer the debited transaction value to the second value account of the second user.

More specifically, the server 21 may be configured to transfer the debited transaction value to an escrow account before transfer to the second value account. The server 21 may be configured to, when receiving a rejection message 28b from the second user 27b in reply to the converted message 28a, then transfer the debited transaction value from the escrow account to the first value account of the first user 27a, and send a notification message 29b to the first user.

Additionally, the at least one communication preference value comprises a plurality thereof, for example, a threshold transaction value (i.e. a minimum transaction value). The server 21 may be configured to, when the transaction value of the message 29a is less than the threshold transaction value of the second user 27b, generate and send a rejection message 29b to the first user 27a.

In some embodiments, the server 21 may be configured to generate the converted message 28a having embedded (e.g. rendered HyperText Markup Language (HTML) code within an HTML formatted email) acceptance and rejection buttons therein. The server 21 may be configured to generate the converted message 28a having at least one URL link embedded within the converted message. The second communications device 24b may be configured to send the acceptance message 28b by accessing the at least one URL link embedded within the converted message 28a. The server 21 may be configured to facilitate the communication between the first and second users 27a-27b by generating a blind VoIP connection between the first and second communications devices 24a-24b. Of course, in other embodiments, the server 21 may facilitate a blind video conference, or an in-person meeting.

Another aspect is directed to a server 21 operating in a communication system 20 having first and second communications devices 24a-24b respectively associated with first and second users 27a-27b. The server 21 may include a processor 23 and memory 22 associated therewith configured to maintain a database comprising first and second communication profiles respectively associated with the first and second users 27a-27b, and maintain first and second value accounts respectively associated with the first and second communication profiles. Each of the first and second communication profiles may comprise an actual email address, a masked email address, and at least one communication preference value. The processor 23 and memory 22 may be configured to receive a message 29a from the first communications device 24a from the actual email address of the first user 27a directed to the masked email address of the second user 27b of the second communications device 24b, the message including a transaction value, and process the message from the first user. The processor 23 and memory 22 may be configured to debit the transaction value from the first value account, convert the message 29a to be from the masked email address of the first user 27a and send the converted message 28a to the actual email address of the second user 27b, and when receiving an acceptance message 28b from the second user in reply to the converted message, then facilitate a communication between the first and second users, and transfer the debited transaction value to the second value account of the second user.

Another aspect is directed to a method for operating a server 21 in a communication system 20 having first and second communications devices 24a-24b respectively associated with first and second users 27a-27b. The method may include operating a processor 23 and memory 22 in the server 21 to maintain a database comprising first and second communication profiles respectively associated with the first and second users 27a-27b, and maintain first and second value accounts respectively associated with the first and second communication profiles. Each of the first and second communication profiles may include an actual email address, a masked email address, and at least one communication preference value. The method may include operating the processor 23 and memory 22 in the server 21 to receive a message 29a from the first communications device 24a from the actual email address of the first user 27a directed to the masked email address of the second user 27b of the second communications device 24b, the message including a transaction value, process the message from the first user, and debit the transaction value from the first value account. The method may include operating the processor 23 and memory 22 in the server 21 to convert the message 29a to be from the masked email address of the first user 27a and send the converted message 28a to the actual email address of the second user 27b, and when receiving an acceptance message 28b from the second user in reply to the converted message, then facilitate a communication between the first and second users, and transfer the debited transaction value to the second value account of the second user.

Referring now to FIGS. 2-10, flowcharts 30, 730, 930, 330, 430, 530, 630a-630b illustrate several embodiments of a method of handling offers/bids from the first user 27a to the second user 27b. In the flowcharts 30, 730, 930, 330, 430, 530, 630a-630b, the N symbol represents a process that triggers a notification to sender, recipient or both. This notification is received via email and/or the native application (push notification)/site. Notifications may include sending an offer, cancellation of an offer, amount put in escrow, acceptance/rejection of connection offer, and release of escrow and payment of funds. The $ symbol represents action results in commission earned/charged by the social network for the transaction taking place. Flowchart 70 illustrates a method for handling referral for a new user.

Below, an exemplary commission table used by the server 21 is provided.

Commission Table

|  | Min | AVG | Max |
| --- | --- | --- | --- |
| 0-299 | 3% | $— | $ 4.50 | $ 8.97 |
| 300-799 | 3.00% | $9.00 | $16.50 | $23.97 |
| 800-1499 | 3% | $24.00 | $34.50 | $44.97 |
| 1500-2999 | 2.00% | $30.00 | $45.00 | $59.98 |
| 3000-4999 | 2.00% | $60.00 | $80.00 | $99.98 |
| >=5000 | 1% | $50.00 |  |  |

Commission Table

In other embodiments, the brokerage fee can be increased to 20%.

In following, an exemplary discussion of the above described communication system 20 and social network is provided.

What is Market Email

A market email platform is an email system where no messages show up in a user's/recipient's inbox unless a riskless and economical/affordable embedded option is an inseparable part of the message itself. Within the market email platform, junk email is defined as any email message that does not possess riskless monetary compensation. A market email is an email message that offers a recipient a default risk free and economical embedded option in return for consideration.

Process Design of a Market E-Mail Exchange

The disclosed market email platform achieves the following:

Monetization of email communication—economic incentives and consequences are created for both senders and recipients;

Elimination of junk email, i.e. all email messages that do not offer a riskless monetary compensation to recipients or senders (whatever the case maybe);

Allows all market email users to continue using their existing personal and work email addresses;

Allows users the ability to monetize all their existing personal and business email addresses;

Creates two types of market emails messages: a) bid emails and b) ask emails;

Allows users to send bid emails to recipients while eliminating the risk of financial default inherent in these to recipients;

Allows users to send ask emails to recipients while eliminating the risk of financial default inherent in these to senders;

Allows senders to communicate with recipients only if they can afford it and are allowed to by recipients;

Allows market email users/recipients to block ask emails from uneconomical senders or allows them to proceed to their inboxes;

Releases funds to sellers only after consideration has been delivered by sellers to buyers; and Message process, message design, message prices, and communication subject to affordability/budget constraints Message Process In order to send or receive market emails, all participants need to:

Generate a new marketable e-mail address at a market email provider;

Open financially functional accounts at a internet payment processor such as PayPal or Dwolla;

Register their previously existing personal and business email addresses with the market email provider/platform;

Set their asking prices for marketable emails;

Users' asking prices for emails set a floor for bid emails and a cap for ask emails;

Create a simple social network for the establishment of connections between all senders and recipients; and Determine which connections on the market email platform are allowed to send ask emails to recipients Message and Market Design and Prices Any bid email from any sender connected or not connected to the recipient with a bid equal to or greater than the recipient's asking price will be forwarded to the recipient's inbox. All bid emails from connected and non-connected senders alike are sent to recipient's inboxes because the platform forwards theses messages to recipient's inboxes only after bids are held in escrow with the internet payment processor, i.e. default risk is eliminated A recipient answering a bid email automatically establishes a social networking connection with the sender so that the recipient may now send ask emails for any further fees due by sender. Recipients may choose to opt out of a social networking connection with sender to which they have replied a bid email, but this will result in the inability of the recipient to send ask emails to the original sender. In some embodiments, a conversation resulting from a recipient answering a bid email is allowed to continue for 7 calendar days as of the date of response to sender. In other embodiments, there would be no time limit for the conversation resulting from the recipient answering the bid email.

The platform also allows for recipients to take market email communication "off market" (see below for a definition) by means of: good until cancel off market order—the user takes the sender off market until further instruction;

limit off market order—the user takes the sender off market for a predetermined amount of time; by default and in order to eliminate unsolicited messages, users will not receive ask emails from unconnected senders; users may choose to receive ask emails from non-connected senders; and users may not block ask emails from connected senders in order to avoid creating a one-sided market.

By default, only ask emails from connected senders with asking prices not in excess of the recipient's asking price are forwarded to the recipients inbox in order to prevent recipients from receiving unaffordable ask emails. Users may choose to receive ask emails from connected senders with prices that do exceed their asking price.

In the case of bid emails, these process design conditions achieve the following: allow senders to send bid emails to recipients only if senders can afford it; and in the case of ask emails, these conditions achieve the following: allows senders to send ask emails to recipients only if recipients allow it and can afford to reply to senders.

What Does the Monetization of Email Achieve?

This process and market design will incentivize recipients to read bid emails and respond to bid messages from unknown/unwanted/undesirable senders because the entire market will know that only messages that met a floor and have no default risk will be allowed. This market design will incentivize senders to send ask emails only to connected recipients and incentivizes recipients to read ask emails from known/wanted/desirable senders because both sides of the market will know that only messages that have not exceeded a recipient's cap will be allowed. Furthermore, the platform offers senders of ask emails the benefit of eliminating the risk of financial default if recipients accept/reply to the sender's ask email.

By means of email masking and forwarding, the disclosed platform will be capable of monetizing users' existing email addresses, maintain privacy of all marketable email exchange participants and create the ability to monetize a popular communication channel that consumes people's time.

On-market Versus Off-Market Relationships

The e-mail platform allows email messages to go through to a recipient's inbox without a riskless embedded option only if the recipient has previously placed the sender on a "do not charge" list. Senders that are on the "do not charge list" are said to be "off the market" vis-à-vis the recipient or have a "non-marketable relationship" with the recipient, i.e. a relationship not contingent on economic incentives and consequences.

Messages from senders are categorized by the system as 1 of 3 kinds:
  Off-market emails: those messages from senders that are on the do not charge list and show up in the recipient's inbox without senders having to pay the recipient;
  On-market or marketable emails: those messages from senders that are not on the do not charge list and that:
    in the case of bid emails senders have met the asking price of the recipient; and
    in case of ask emails are from a sender that has an existing social networking/market email platform connection with the recipient and asks for compensation less than or equal to the recipient's price.
  Those messages that are not either 1 or 2 and therefore are simply deleted by the market email server and never presented to the recipient in any form Users who charge must reply in order to collect from senders who pay. In bid emails, recipients get paid only if and after they reply to the sender. Since senders/buyers contact recipients/sellers only because they want the recipient to perform some action in return (e.g. answer a specific question), payment is not forwarded to the recipient until a response is obtained. In ask emails, recipients can reply only if they put up in escrow the sender's asking price.

Bid Email Example

BMW sends a market email recipient a survey that must have a marketable (and actionable) question and an easy and quick way to answer their question like incorporating an "answer box" with a binary (yes/no, good/bad, interested/not interested) field. If the receiving party does not respond within a certain time frame (let's start with 7 days), then the receiving party (the seller) forfeits the bid and incurs an opportunity cost.

"Dear Peter: BMW is considering launching a mid-sized 4 door electric sedan prices for around $60 k. Would you considering purchasing such a BMW product?"

Ask Email Example

BMW sends a market email recipient an offer for a car in return for monetary compensation. The recipient can answer the sender's ask email only if the recipient has place in escrow the sender's asking price.

"Dear Peter: Answer to this ask email and we will deliver to your doorstep our mid-sized 4 door electric sedan for $50 k".

How to Incorporate Market Email into Existing Email Providers/Applications/Platforms People have grown attached to their existing email providers. Given the fact that Google, Microsoft, Yahoo! and other email providers have long dominated the email market, the disclosed process and platform allows users of a marketable email platform/market to continue using their existing email accounts and web or application based software while completely concealing their existing email addresses.

The Process/Approach

Our marketable email process allows market email users to continue using their existing email addresses/platforms/providers (e.g. Gmail, Outlook.com, Yahoo!, MSN, AOL, corporate email, etc.) and simultaneous participate in the marketable email market.

Assumptions

Email users wish to continue using their existing personal or business email accounts, software and providers—they do not want to abandon using the platforms they already use and they do not want to change the email addresses they already have. Users want to participate in market email based message exchange platform because it offers the following economic opportunities and benefits:
  Allows senders of email messages to send bids to recipients in exchange for verified replies or receipt of consideration (i.e. "bid emails");
  Allows senders of email messages to send asking prices in exchange for performing an action for the recipient or delivery of consideration (i.e. "ask emails");
  Both senders and recipients are active users of a market email platform; and
  Both senders and recipients have an active non-market email address and have chosen a market email address for themselves.
Non-market email addresses are never published to the market—they are not even masked or scrambled on the market email platform (i.e. internally).

How to Incorporate Existing Email Addresses/Platforms with Bid Emails

Sender with a personal or business non-market email address sends a bid email message to recipient's publicly available market email address. Because the sender is an active market email user and has uploaded his non-market address to his user profile, the market email server identifies the sender's personal or business email address and converts his non-market email address to his market email address. The email message will be forwarded to the recipient's personal/business email address with the sender shown to have a market email address. From the recipient's point of view, the sender is someone with a market email address. The recipient has no way of knowing what the sender's personal or business email address is.

A Bid Email Creates Two Types of Risk

The risk that the recipient will not get paid by the sender. The risk that the sender will not receive the consideration asked for in exchange for the funds. In order for the market email platform to forward the bid email to the recipient, the bid must first be debited to the payment processor account of the sender and held in escrow.

Assuming that the recipient has agreed to deliver the consideration requested in the bid email and replies to the message, the market email platform also changes the recipients/repliers email address from his personal address to his market email address. The email is then forwarded to the original sender. From the original sender's point of view, the original recipient/replier has a market email account. The original sender has no way of knowing what the original recipient/replier's personal or business email address is.

The original recipient delivers the consideration for the bid price (e.g. answers a question or survey). The original sender informs the market email platform that consideration has been received. The market email platform releases the bid price held in escrow and transfers the funds after a brokerage commission to the original recipient's account (e.g. PayPal or Dwolla).

Ask Emails

Sender with a personal or business non-market email address sends an asking price email message to recipient's publicly available market email address. Because the sender is an active market email user and has uploaded his non-market email address to his user profile, the market email server identifies the sender's personal or business email address (whatever the case maybe) and converts his non-market email address to his market email address. The email message is now forwarded to the recipient's personal email address with the sender shown to have a market email address. From the recipient's point of view, the sender is someone with a market email address. The recipient has no way of knowing what the sender's personal or business email address is.

An Asking Price Email Creates Two Types of Risk

The risk that the sender will not get paid by the recipient. The risk that the recipient will not receive the consideration offered in exchange of the funds. Assuming that the recipient replies to the asking email and accepts the asking price, the market email platform first debits from the recipient the asking price and holds it in escrow.

The market email platform also changes the recipients/repliers email address from his personal address to his market email address. The email is forwarded to the original sender. From the original sender's point of view, the original recipient/replier has a market email account. The original sender delivers the consideration for the asking price. The original recipient informs the market email platform that consideration has been received. The market email platform releases the asking price (paid from recipient to original sender) held in escrow and transfers the funds (after a brokerage commission paid to the market email platform) to the original recipient's account (e.g. PayPal or Dwolla).

Process to Eliminate the Risk of Bid Email Fraud

Since hackers can theoretically steal market email user's personal or business address (i.e. email phishing) and send to the market email server a phished bid email to pay themselves, all sellers/recipients of bid emails must put up in escrow the asking price. This eliminates the incentive to phish for market email addresses. A trade date is established and a settlement date is set 14 days forward in order to allow time for users to verify that all bid emails where in fact sent authorized by themselves and not hackers.

Notes About this Process/System

In bid emails, the original senders/bidders cannot send messages to recipients unless their bids are previously held in escrow. In bid emails, the main risk to eliminate is the risk of the funds not being delivered by the sender. For example, Tesla Motors sends Peter Azcue Attolini a bid email with consideration being answering a simple yes or no market research question.

In ask emails, the original recipients cannot reply to senders unless the asking price has been held in escrow. In ask emails, the main risk to eliminate is the risk of consideration not being delivered by the sender. For example, Tesla motors sends Peter an ask email with consideration being the delivery of a new Model S in exchange for $50 k.

The risk inherent to both types of market emails is the non-financial component of the trade that cannot be held in escrow. Therefore, funds are released only after consideration has been delivered by the recipient in the case of bid emails or delivered to the recipient in the case of ask emails. In financial derivatives terms, bid emails have embedded short puts and ask emails have embedded short calls.

Market Recruiter: Any user can serve as a market recruiter on Loturas. A market recruiter creates a job posting, along with a description and offered annual compensation. An "apply price" is also created that an applicant must put up in escrow in order to apply for the position created by the recruiter. In exchange for the applicant putting up the apply price in escrow, the recruiter must first interview the applicant in order to receive the apply price as compensation; i.e. in order for the apply price to move from escrow to the recruiter's account, the recruiter must interview the applicant through either a market phone call or market videoconferencing.

Market recruiter, its pricing design and escrow and payment process, serves to create a far more efficient, transparent, and radically less discriminatory labor market and eliminate the risks pertinent to each side of the market:

a) The recruiter faces the risk of:
i. Non compensation risk—the risk of not being compensated for his or her time.
ii. Excess applications risk—the risk of receiving too many applications
iii. Non qualified application risk—the risk of receiving applications from nonqualified and the genuinely not-interested applicants b) The applicant faces the risk of:
i. Discrimination risk—the risk that an applicant is turned down for a position without even being interview by the recruiter
ii. Performance risk of the recruiter—the risk that the recruiter never responds and interviews the applicant because the recruiter simply failed to do his job
iii. Excess competition risk—the risk that the applicant faces the risk of excessive competition
iv. False advertising risk—the risk that there is in fact no position behind the advertised job (see below for a strong check and balance to this risk)

After the applicant is interviewed, the apply price moves from escrow to the recruiter's account and the applicant reviews the recruiter on the network.

How to Eliminate the Risk of False Jobs Posted on Loturas

In order to eliminate the risk that jobs posted on Loturas are not backed by an actual position, the recruiter will have a credibility score along with the history of Loturas users hired by him across the network. The recruiter will be heavily incentivized to publish to the social network with a time interval (3, 6 9 months for example) just who he hired for the advertised position otherwise his labor market credibility score will fall. A recruiter with a low labor market credibility score will be avoided by future applicants and the recruiter will lose this permanent and global source of income that the Loturas platform has created for him.

About the Apply Price of Market Recruiter

When applicants are searching for jobs in the labor market, they often use LinkedIn to contact potential employers and even apply to positions. Anyone who has attempted to apply to jobs in this fashion quickly realizes that this application channel presents a frustrating contradiction to the applicant: it is the channel where the most positions are to be found and applied to but it is almost completely useless and hardly ever gets the attention of an employer or recruiter.

The apply price established by the recruiter sends a clear, indirect signal to the applicant which of the jobs on the market he or she is qualified for and most likely to obtain. For example, a recent MBA graduate from a top tier school is looking for positions that pay north of $100,000 per year and the apply price for positions with this level of annual compensation will reflect this level of compensation. For argument's sake suppose that a position with an annual compensation of $100 k has an apply price of $250 and a position paying $5 million per year has an apply price of $12.5 k (I'm assuming that apply prices will be 25 bps of total annual compensation). The recent MBA will immediately know by means of comparing apply prices that the $5 million position is beyond his reach and will be compelled by market forces to apply to the position with the apply price of $300 since he cannot afford the more desirable alternative. In other words, the free market possesses the necessary wisdom to channel applicants to those positions where they are very likely to obtain an interview and most likely to be employed.

Logically, as the labor market increases demand for labor, apply prices will rise and as the labor market decreases demand, apply prices will fall. If labor market demand falls, apply prices will fall while increasing applications. This entices recruiters to increase apply prices to a level where they maximize their income. Therefore, there exists an apply price where the demand and supply of applications is in equilibrium.

Example components that may be used in the first and second communications devices 24a-24b and the server 21 of FIG. 1 are further described below with reference to FIGS. 11-14. Generally speaking, a mobile device may be configured according to an information technology (IT) policy. It should be noted that the term IT policy, in general, refers to a collection of IT policy rules, in which the IT policy rules can be defined as being either grouped or non-grouped and global or per-user. The terms grouped, non-grouped, and global and per-user are defined further below. Examples of applicable communication devices include pagers, cellular phones, cellular smart-phones, wireless organizers, personal digital assistants, computers, laptops, handheld wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device and how it communicates with other devices and host systems, reference will now be made to FIGS. 11-14.

Figure 11:
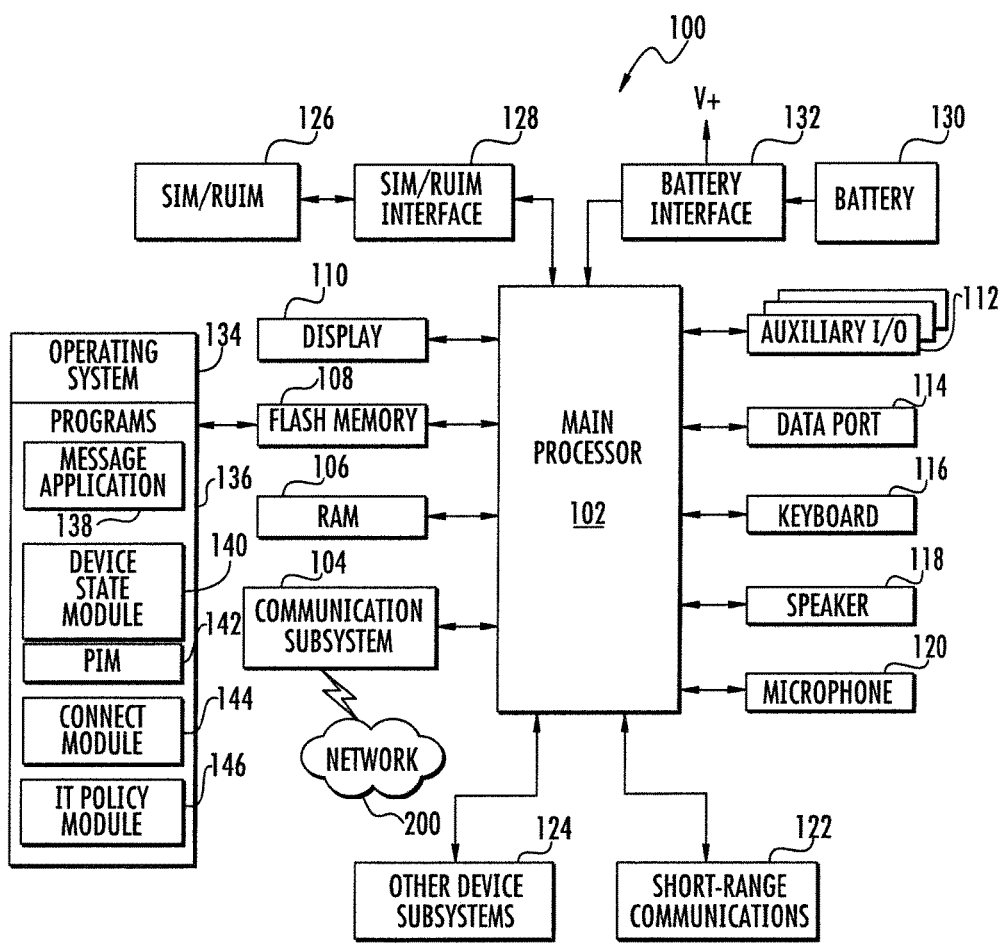
FIG. 11 is a block diagram of an example embodiment of a mobile device that may be used with the communication system of FIG. 1.

Referring first to FIG. 11, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the example embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example implementation, other wireless networks may also be associated with the mobile device 100 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), third-generation (3G) networks like EDGE and UMTS, and fourth generation Long-Term Evolution (LTE) networks. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard (e.g. physical keyboard or a virtual touchscreen keyboard) 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e., Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIN/RUIM interface 128, a subscriber can access all subscribed services. Services may include: web browsing and messaging such as email, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including date book (or calendar) information and recent call information. Alternatively, user identification information can also be programmed into the flash memory 108.

The mobile device 100 is a battery-powered device and includes a battery interface 132 for receiving one or more rechargeable batteries 130. In at least some example embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some example embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, email, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 13 and 14, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some example embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. In some embodiments, the OS of the mobile device 100 may have an associated application marketplace for accessing the additional applications. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an email message, or web page download will be processed by the communication subsystem 104 and input to the main processor 102. The main processor 102 will then process the received signal for output to the display 110 or alternatively to the auxiliary I/O subsystem 112. A subscriber may also compose data items, such as email messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 12:
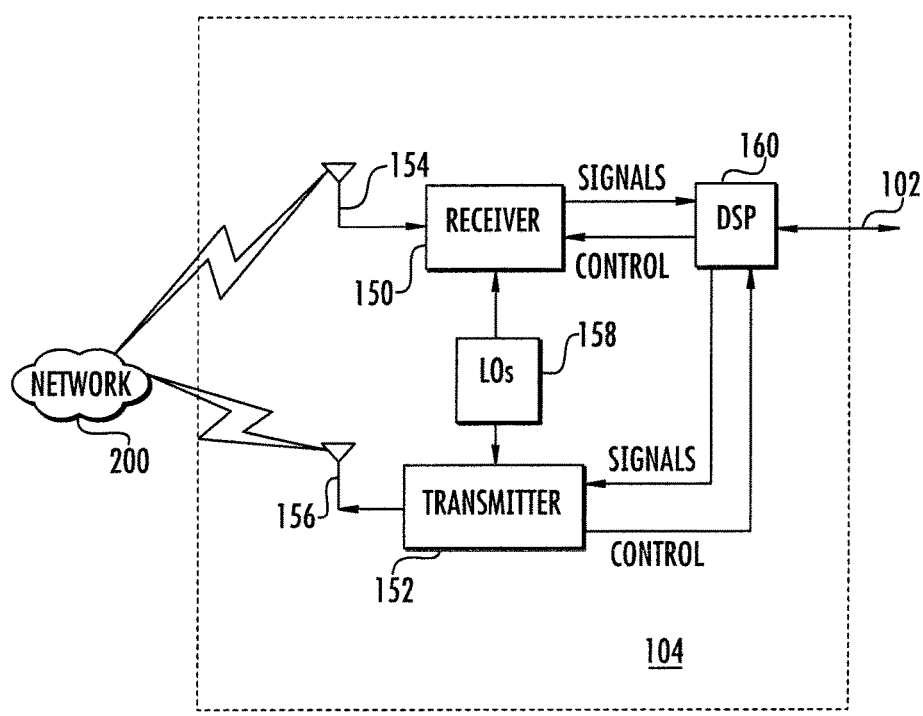
FIG. 12 is a block diagram of an example embodiment of a communication subsystem component of the mobile device of FIG. 11.

Referring now to FIG. 12, an example block diagram of the communication subsystem component 104 is shown. The communication subsystem 104 includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is dependent upon the communication network 200 with which the mobile device 100 is intended to operate. Thus, it should be understood that the design illustrated in FIG. 12 serves only as one example.

Signals received by the antenna 154 through the wireless network 200 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 200 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 100 and the wireless network 200 can contain one or more different channels, typically different RF channels, and associated protocols used between the mobile device 100 and the wireless network 200. An RF channel is a limited resource that must be conserved, typically due to limits in overall bandwidth and limited battery power of the mobile device 100.

When the mobile device 100 is fully operational, the transmitter 152 is typically keyed or turned on only when it is transmitting to the wireless network 200 and is otherwise turned off to conserve resources. Similarly, the receiver 150 is periodically turned off to conserve power until it is needed to receive signals or information (if at all) during designated time periods.

Figure 13:
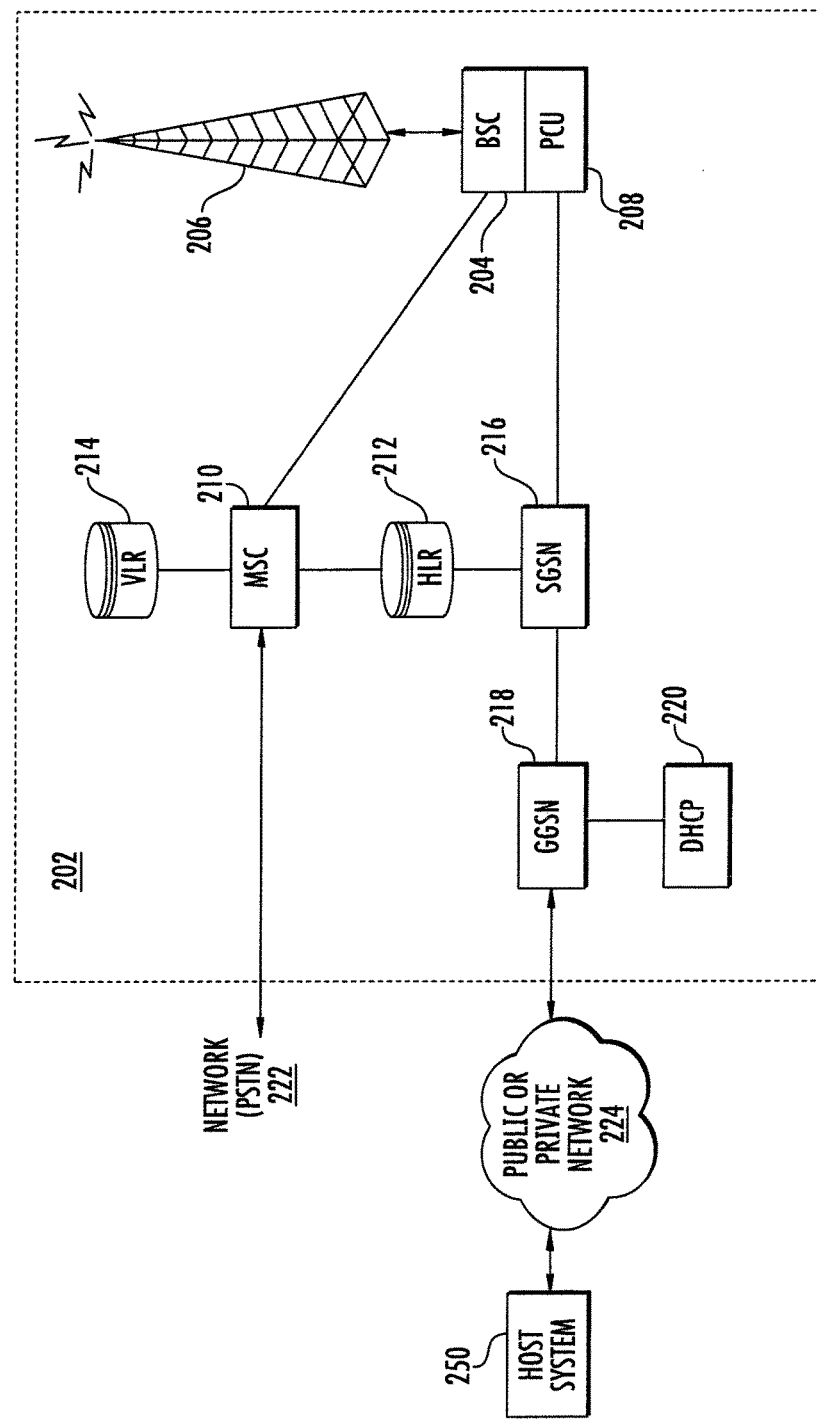
FIG. 13 is an example block diagram of a node of a wireless network.

Referring now to FIG. 13, a block diagram of an example implementation of a node 202 of the wireless network 200 is shown. In practice, the wireless network 200 includes one or more nodes 202. In conjunction with the connect module 144, the mobile device 100 can communicate with the node 202 within the wireless network 200. In the example implementation of FIG. 13, the node 202 is configured in accordance with General Packet Radio Service (GPRS) and Global Systems for Mobile (GSM) technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to a public or private network (Internet) 224 (also referred to herein generally as a shared network infrastructure) represents the data path for GPRS capable mobile devices. In a GSM network extended with GPRS capabilities, the BSC 204 also contains the Packet Control Unit (PCU) 208 that connects to the SGSN 216 to control segmentation, radio channel allocation and to satisfy packet switched requirements. To track the location of the mobile device 100 and availability for both circuit switched and packet switched management, the HLR 212 is shared between the MSC 210 and the SGSN 216. Access to the VLR 214 is controlled by the MSC 210.

The station 206 is a fixed transceiver station and together with the BSC 204 form fixed transceiver equipment. The fixed transceiver equipment provides wireless network coverage for a particular coverage area commonly referred to as a "cell." The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device 100 in accordance with particular, usually predetermined, communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further, the VLR 214 also contains information on mobile devices that are visiting other networks. The information in the VLR 214 includes part of the permanent mobile device data transmitted from the HLR 212 to the VLR 214 for faster access. By moving additional information from a remote HLR 212 node to the VLR 214, the amount of traffic between these nodes can be reduced so that voice and data services can be provided with faster response times and at the same time requiring less use of computing resources.

The SGSN 216 and the GGSN 218 are elements added for GPRS support, namely packet switched data support, within GSM. The SGSN 216 and the MSC 210 have similar responsibilities within the wireless network 200 by keeping track of the location of each mobile device 100. The SGSN 216 also performs security functions and access control for data traffic on the wireless network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208, and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com."

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be de-allocated and the IP address returned to the IP address pool managed by the DHCP server 220.

Figure 14:
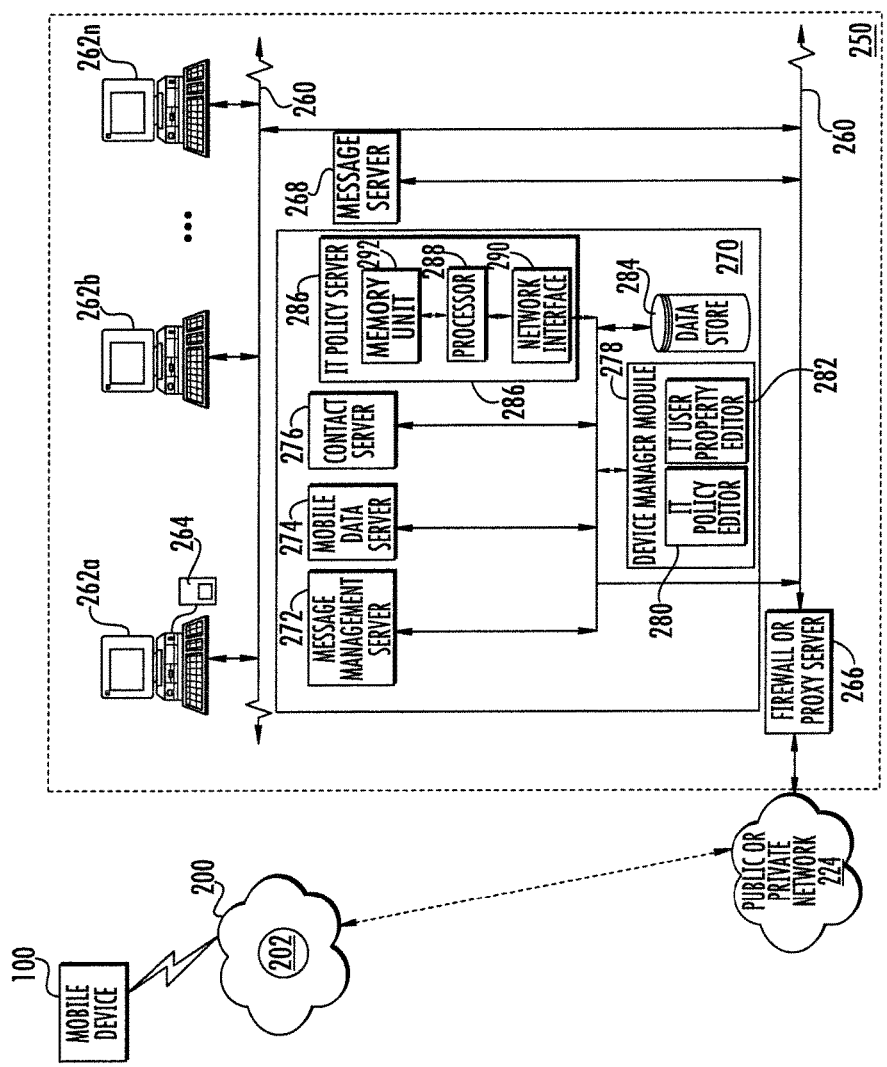
FIG. 14 is a block diagram illustrating components of a host system in one example configuration for use with the wireless network of FIG. 13 and the mobile device of FIG. 11.

Referring now to FIG. 14, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant implementations. In this example shown in FIG. 14, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 includes a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e. g., PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 14. Furthermore, only a subset of network components of the host system 250 are shown in FIG. 11 for ease of exposition, and it will be understood by persons skilled in the art that the host system 250 will include additional components that are not explicitly shown in FIG. 12 for this example configuration. More generally, the host system 250 may represent a smaller part of a larger network (not shown) of the organization, and may include different components and/or be arranged in different topologies than that shown in the example embodiment of FIG. 14.

To facilitate the operation of the mobile device 100 and the wireless communication of messages and message-related data between the mobile device 100 and components of the host system 250, a number of wireless communication support components 270 can be provided. In some implementations, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative example embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some implementations, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some implementations, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative implementation.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly email messages, within the organization and over the shared network infrastructure 224. Each user in the organization that has been set up to send and receive messages is typically associated with a user account managed by the message server 268. Some example implementations of the message server 268 include a Microsoft Exchange™ server, a Lotus Domino™ server, a Novell Groupwise™ server, or another suitable mail server installed in a corporate environment. In some implementations, the host system 250 may include multiple message servers 268. The message server 268 may also be adapted to provide additional functions beyond message management, including the management of data associated with calendars and task lists, for example.

When messages are received by the message server 268, they are typically stored in a data store associated with the message server 268. In at least some example embodiments, the data store may be a separate hardware unit, such as data store 284, that the message server 268 communicates with. Messages can be subsequently retrieved and delivered to users by accessing the message server 268. For instance, an email client application operating on a user's computer 262*a* may request the email messages associated with that user's account stored on the data store associated with the message server 268. These messages are then retrieved from the data store and stored locally on the computer 262*a*. The data store associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have email messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 100 is assigned its own email address, and messages addressed specifically to the mobile device 100 are automatically redirected to the mobile device 100 as they are received by the message server 268.

The message management server 272 can be used to specifically provide support for the management of messages, such as email messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e. g. the message store associated with the user's account on the message server 268) for new email messages, and apply user-definable filters to new messages to determine if and how the messages are relayed to the user's mobile device 100. The message management server 272 may also compress and encrypt new messages (e. g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e. g., encrypted using Triple DES), decrypt and decompress the composed messages, re-format the composed messages if desired so that they will appear to have originated from the user's computer 262*a*, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum predefined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and email address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may include multiple message management servers 272, particularly in variant implementations where a large number of mobile devices need to be supported.

Alternatively, in some example embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A communication system comprising:
a server comprising a processor and memory associated therewith; and
a first communication device and a second communication device respectively associated with first and second users, each of said first and second communications devices comprising a processor and memory associated therewith;
said server configured to
maintain a database for a social media network, the database comprising first and second communication profiles respectively associated with the first and second users, and
maintain first and second value accounts respectively associated with the first and second communication profiles;
each of said first and second communication profiles comprising an actual email address, a masked email address, at least one communication preference value, and a friends list comprising a plurality of friended communication profiles;
when the first user and the second user are not friends within the social media network, said first communications device configured to send a message from the actual email address of the first user to the masked email address of the second user of said second communications device via said server, the message including an offer of a transaction value for a brokered communication exchange;
when the first user and the second user are not friends within the social media network, said server configured to
process the message from the first user,
debit the transaction value from the first value account,
convert the message to be from the masked email address of the first user and send the converted message to the actual email address of the second user, and
when receiving an acceptance message from the second user in reply to the converted message, then
provide the brokered communication exchange as a blind digital conference between the first and second users, and
transfer the debited transaction value to the second value account of the second user;
when the first user and the second user are friends within the social media network, said first communications device configured to send a broadcast message to all users in a respective friends list of the first communication profile, the respective friends list including the second user, the broadcast message including the offer for the brokered communication exchange with a non-friended user, the second user to forward the broadcast message to the non-friended user in a friends list associated with the second user; and
when the first user and the second user are friends within the social media network, said server configured to
when receiving another acceptance message from the non-friended user in reply to the broadcast message, then
provide the brokered communication exchange as the blind digital conference between the first user and the non-friended user, and
transfer the transaction value corresponding to the offer for the brokered communication exchange with the non-friended user to a value account of the non-friended user.

2. The communication system of claim 1 wherein said server is configured to transfer the debited transaction value to an escrow account before transfer to one of the second value account and the value account of the non-friended user.

3. The communication system of claim 2 wherein said server is configured to, when receiving a rejection message from the second user in reply to the converted message, then transfer the debited transaction value from the escrow account to the first value account of the first user, and send a notification message to the first user.

4. The communication system of claim 1 wherein the at least one communication preference value comprises a plurality of communication preference values.

5. The communication system of claim 1 wherein the at least one communication preference value comprises a threshold transaction value.

6. The communication system of claim 5 wherein said server is configured to, when the transaction value of the message is less than the threshold transaction value of the second user, generate and send a rejection message to the first user.

7. The communication system of claim 1 wherein said server is configured to generate the converted message having embedded acceptance and rejection buttons therein.

8. The communication system of claim 1 wherein said server is configured to generate the converted message having at least one uniform resource locator (URL) link embedded within the converted message.

9. The communication system of claim 8 wherein said second communication device is configured to send the acceptance message by accessing the at least one URL link embedded within the converted message.

10. A method for operating a server in a communication system having a first communication device and a second communication device respectively associated with first and second users, the method comprising:
operating a processor and memory in the server to
maintain a database for a social media network, the database comprising first and second communication profiles respectively associated with the first and second users, and
maintain first and second value accounts respectively associated with the first and second communication profiles;
each of the first and second communication profiles comprising an actual email address, a masked email address, at least one communication preference value, and a friends list comprising a plurality of friended communication profiles; and when the first user and the second user are not friends within the social media network, operating the processor and memory in the server to
receive a message from the first communications device from the actual email address of the first user directed to the masked email address of the second user of the second communications device, the message including an offer of a transaction value for a brokered communication exchange,
process the message from the first user,
debit the transaction value from the first value account,
convert the message to be from the masked email address of the first user and send the converted message to the actual email address of the second user, and
when receiving an acceptance message from the second user in reply to the converted message, then
provide the brokered communication exchange as a blind digital conference between the first and second users, and
transfer the debited transaction value to the second value account of the second user;

when the first user and the second user are friends within the social media network, the first communications device configured to send a broadcast message to all users in a respective friends list of the first communication profile, the respective friends list including the second user, the broadcast message including the offer for the brokered communication exchange with a non-friended user, the second user to forward the broadcast message to the non-friended user in a friends list associated with the second user;

when the first user and the second user are friends within the social media network, the server configured to
when receiving another acceptance message from the non-friended user in reply to the broadcast message, then
provide the brokered communication exchange as the blind digital conference between the first user and the non-friended user, and
transfer the transaction value corresponding to the offer for the brokered communication exchange with the non-friended user to a value account of the non-friended user.

11. The method of claim 10 further comprising operating the processor and memory to transfer the debited transaction value to an escrow account before transfer to one of the second value account and the value account of the non-friended user.

12. The method of claim 11 further comprising operating the processor and memory to, when receiving a rejection message from the second user in reply to the converted message, then transfer the debited transaction value from the escrow account to the first value account of the first user, and send a notification message to the first user.

13. The method of claim 10 wherein the at least one communication preference value comprises a threshold transaction value.

14. The method of claim 13 further comprising operating the processor and memory to, when the transaction value of the message is less than the threshold transaction value of the second user, generate and send a rejection message to the first user.

15. A social media network system comprising:
a server comprising a processor and memory associated therewith and configured to provide a social media network; and
a first communication device and a second communication device respectively associated with first and second social media network users in the social media network, each of said first and second communications devices comprising a processor and memory associated therewith;
said server configured to
maintain a database comprising first and second communication profiles respectively associated with the first and second social media network users, and
maintain first and second value accounts respectively associated with the first and second communication profiles;
each of said first and second communication profiles comprising an actual email address, a masked email address, at least one communication preference value, and a friends list comprising a plurality of friended communication profiles;
when the first social media network user and the second social media network user are not friends within the social media network, said first communications device configured to send a message from the actual email address of the first social media network user to the masked email address of the second social media network user of said second communications device via said server, the message including an offer of a transaction value for a brokered communication exchange;
when the first social media network user and the second social media network user are not friends within the social media network, said server configured to
process the message from the first social media network user,
debit the transaction value from the first value account,
convert the message to be from the masked email address of the first social media network user and send the converted message to the actual email address of the second social media network user, and
when receiving an acceptance message from the second social media network user in reply to the converted message, then
provide the brokered communication exchange as a blind digital conference between the first and second social media network users, and
transfer the debited transaction value to the second value account of the second social media network user;
when the first social media network user and the second social media network user are friends within the social media network, said first communications device configured to send a broadcast message to all social media network users in a respective friends list of the first communication profile, the respective friends list including the second social media network user, the broadcast message including the offer for a the brokered communication exchange with a non-friended social media network user, the second social media network user to forward the broadcast message to the non-friended social media network user in a friends list associated with the second social media network user;
when the first social media network user and the second social media network user are friends within the social media network, said server configured to when receiving another acceptance message from the non-friended social media network user in reply to the broadcast message, then provide the brokered communication exchange as the blind digital conference between the first social media network user and the non-friended social media network user, and transfer the transaction value corresponding to the offer for the brokered communication exchange with the non-friended social media network user to a value account of the non-friended social media network user.

16. The social media network system of claim 15 wherein said server is configured to transfer the debited transaction value to an escrow account before transfer to one of the second value account and the value account of the non-friended social media network user.

17. The social media network system of claim 16 wherein said server is configured to, when receiving a rejection message from the second social media network user in reply to the converted message, then transfer the debited transaction value from the escrow account to the first value account of the first social media network user, and send a notification message to the first social media network user.

18. The social media network system of claim 15 wherein the at least one communication preference value comprises a plurality of communication preference values thereof.

19. The social media network system of claim 15 wherein the at least one communication preference value comprises a threshold transaction value.

20. The social media network system of claim 19 wherein said server is configured to, when the transaction value of the message is less than the threshold transaction value of the second social media network user, generate and send a rejection message to the first social media network user.

* * * * *